(12) United States Patent
Baker

(10) Patent No.: US 8,757,824 B2
(45) Date of Patent: Jun. 24, 2014

(54) POINTER OF AN INSTRUMENT DRIVEN WITH A SHAFTLESS STEPPER MOTOR CONTAINING A LIGHTING MECHANISM FOR LIGHTING THE POINTER

(75) Inventor: Mark James Arthur Baker, Grays (GB)

(73) Assignee: Visteon Global Technologies, Inc., Van Buren Township, MI (US)

( * ) Notice: Subject to any disclaimer, the term of this patent is extended or adjusted under 35 U.S.C. 154(b) by 118 days.

(21) Appl. No.: 13/603,962

(22) Filed: Sep. 5, 2012

(65) Prior Publication Data

US 2014/0063778 A1    Mar. 6, 2014

(51) Int. Cl.
*G01D 11/28* (2006.01)

(52) U.S. Cl.
USPC ............ 362/23.01; 362/23.07; 362/23.09; 362/23.11; 362/489; 116/250; 116/48; 116/288

(58) Field of Classification Search
USPC .......... 362/23.01, 23.07, 23.09, 23.11, 23.12, 362/23.19, 23.2, 23.21, 489; 116/48, 288, 116/310, 286, 250
See application file for complete search history.

(56) References Cited

U.S. PATENT DOCUMENTS

| | | | |
|---|---|---|---|
| 1,033,610 A | 7/1912 | Nash | |
| 1,119,648 A | 12/1914 | Sheldon | |
| 2,757,364 A | 7/1956 | Hood | |
| 2,992,560 A | 11/1956 | Morgan et al. | |
| 2,958,181 A | 11/1960 | Laughlin | |
| 3,486,479 A | 12/1969 | Hartmann | |
| 3,595,010 A | 7/1971 | Kaiser | |
| 3,996,881 A | 12/1976 | Schneider | |
| 4,016,827 A | 4/1977 | Lawrence, Jr. | |
| 4,195,518 A | 4/1980 | Fees | |
| 5,357,815 A * | 10/1994 | Williamson | 73/866.3 |
| 6,647,771 B2 * | 11/2003 | Burns | 73/146 |
| 7,281,490 B2 * | 10/2007 | Buchanan | 116/271 |
| 7,654,220 B2 | 2/2010 | Yagi et al. | |
| 7,690,323 B2 | 4/2010 | Ross, Jr. | |
| 7,722,202 B2 | 5/2010 | Tsurumi et al. | |
| 7,810,444 B2 | 10/2010 | Sultan et al. | |
| 8,151,725 B2 | 4/2012 | Masuda et al. | |
| 2006/0164229 A1 * | 7/2006 | Masters et al. | 340/461 |
| 2006/0209637 A1 * | 9/2006 | May et al. | 368/223 |
| 2010/0043697 A1 | 2/2010 | Masuda et al. | |

* cited by examiner

*Primary Examiner* — Ali Alavi

(74) *Attorney, Agent, or Firm* — Klintworth & Rosenblat IP LLC

(57) ABSTRACT

A system includes a layer, a shaftless stepper motor, a lighting element, an input magnet, an output magnet, and a pointer. The layer includes first and second opposed sides. The shaftless stepper motor is disposed on the first opposed side of the layer. The lighting element is disposed on the first opposed side of the layer. The input magnet is disposed on the first opposed side of the layer and is connected to the shaftless stepper motor. The output magnet is disposed on the second opposed side of the layer. The pointer is connected to the output magnet. The input magnet connected to the shaftless stepper motor moves, through magnetism, the output magnet and the connected pointer, and the lighting element transmits lights to light the pointer.

31 Claims, 3 Drawing Sheets

POINTER OF AN INSTRUMENT DRIVEN WITH A SHAFTLESS STEPPER MOTOR CONTAINING A LIGHTING MECHANISM FOR LIGHTING THE POINTER

FIELD OF THE DISCLOSURE

This disclosure relates to a system and method for magnetically coupling a pointer of an instrument to a shaftless stepper motor containing a lighting mechanism for lighting the pointer.

BACKGROUND

Pointers of instruments, such as a pointer of a vehicle instrument panel, often need to be lit and moved precise distances. Some existing pointers are moved through shafts which extend through a display to a motor powering their movement. However, this may be aesthetically undesirable. Other existing pointers use members extending around the display to move the pointer. However, this may again be aesthetically undesirable. Some pointers are lit with lighting elements disposed on the same side of the display as the pointer. However, this may also be aesthetically undesirable.

A system and method is needed to overcome one or more issues of one or more of the existing systems and methods of moving and lighting pointers.

SUMMARY

In one embodiment, a system is disclosed. The system includes a layer, a shaftless stepper motor, a lighting element, an input magnet, an output magnet, and a pointer. The layer includes first and second opposed sides. The shaftless stepper motor is disposed on the first opposed side of the layer. The lighting element is disposed on the first opposed side of the layer. The input magnet is disposed on the first opposed side of the layer and is connected to the shaftless stepper motor. The output magnet is disposed on the second opposed side of the layer. The pointer is connected to the output magnet. The input magnet connected to the shaftless stepper motor moves, through magnetism, the output magnet and the connected pointer, and the lighting element transmits lights to light the pointer.

In another embodiment, an instrument of a vehicle is disclosed. The instrument of the vehicle includes a display, a shaftless stepper motor, a lighting element, an input magnet, an output magnet, and a pointer. The display includes first and second opposed sides. The shaftless stepper motor is disposed on the first opposed side of the display. The lighting element is disposed on the first opposed side of the display. The input magnet is disposed on the first opposed side of the display and is connected to the shaftless stepper motor. The output magnet is disposed on the second opposed side of the display. The pointer is connected to the output magnet. The input magnet connected to the shaftless stepper motor moves, through magnetism, the output magnet and the connected pointer, and the lighting element transmits lights to light the pointer.

In still another embodiment, a method of operating a pointer is disclosed. In one step, an input magnet connected to a shaftless stepper motor, disposed on a first side of a layer, is moved to move through magnetism an output magnet and a pointer connected to the output magnet each of which are disposed on a second side of the layer which is opposed to the first side of the layer. In another step, the pointer is lit with light transmitted from a lighting element of the shaftless stepper motor.

The scope of the present disclosure is defined solely by the appended claims and is not affected by the statements within this summary.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
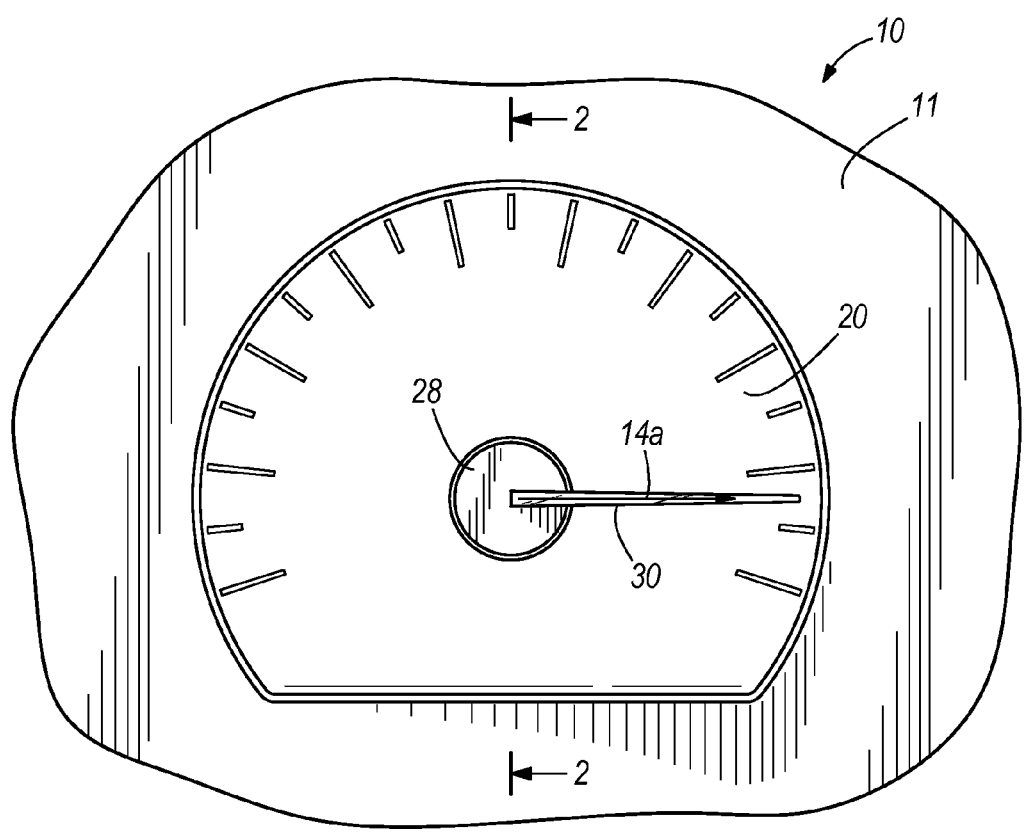
FIG. 1 illustrates a top view of one embodiment of a system.
Figure 2:
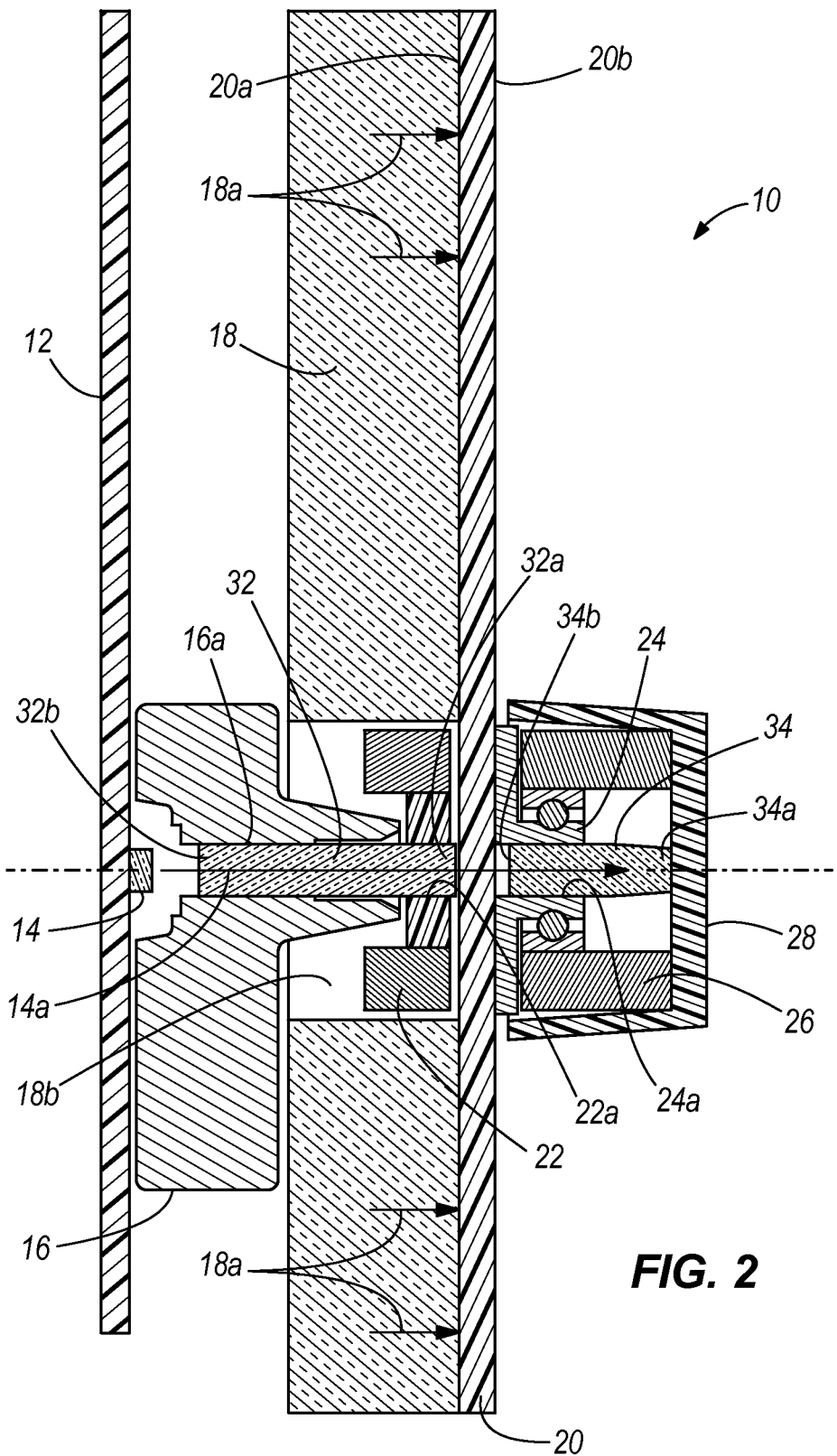
FIG. 2 illustrates a cross-section view through line 2-2 of FIG. 1.

FIG. 1 illustrates a top view of one embodiment of a system 10. FIG. 2 illustrates a cross-section view through line 2-2 of FIG. 1. As shown collectively in FIGS. 1-2, the system 10 comprises a circuit board 12, a lighting element 14, a motor 16, a display backlight 18, a layer 20, an input magnet 22, a bearing 24 an output magnet 26, a cap 28, a pointer 30, and shafts 32 and 34. The system 10 may comprise a vehicle instrument of a vehicle 11. The layer 20 comprises first and second opposed sides 20a and 20b. The layer 20 may comprise a display of the vehicle 11. The layer 20 may comprise a liquid crystal display, a thin film transistor liquid crystal display, another type of display which allows light to travel through the display, or another type of layer. The circuit board 12 is disposed on the first side 20a of the layer 20. The circuit board 12 is electronically connected to the lighting element 14 and the motor 16 to control or power the lighting element 14 and the motor 16. In other embodiments, the circuit board 12 may be electronically connected to either the lighting element 14 or the motor 16 to control or power either one.

The motor 16 is disposed on the first opposed side 20a of the layer 20. The motor 16 may comprise a shaftless stepper motor having a shaftless portion 16a. The shaftless portion 16a comprises a hole in the motor 16. The lighting element 14 is disposed on the first opposed side 20a of the layer 20. The lighting element 14 may comprise a light-emitting diode or other type of lighting element. The lighting element 14 is aligned with and within the shaftless portion 16a of the shaftless stepper motor 16. The lighting element 14 transmits light 14a through the shaftless portion 16a of the shaftless stepper motor 16, through the layer 20, and to the pointer 30 to light up the pointer 30. The display backlight 18 is disposed on the first opposed side 20a of the layer 20 and is connected to the layer 20. The display backlight 18 transmits backlight 18a to the layer 20.

The input magnet 22 is disposed on the first opposed side 20a of the layer 20. The input magnet 22 is disposed within a hole 18b in the display backlight 18 next to the first opposed side 20a of the layer 20. The shaft 32 extends between and is connected to each of the input magnet 22 and the shaftless stepper motor 16 thereby connecting the input magnet 22 to the shaftless stepper motor 16. One end 32a of the shaft 32 is threadedly attached to a hole 22a in the input magnet 22. Another end 32b of the shaft 32 is threadedly attached to the shaftless portion 16a of the shaftless stepper motor 16. In other embodiments, varying attachment mechanisms may be used. In such manner, as the shaftless stepper motor 16 rotates, the shaft 32 also rotates which in turn rotates the input magnet 22.

The bearing 24 is disposed on the second opposed side 20b of the layer 20 and is connected to the second opposed side 20b of the layer 20. The output magnet 26 is moveably attached to the bearing 24 on the second opposed side 20b of the layer 20. Shaft 34 extends between and is connected to each of the bearing 24 and the cap 28. One end 34a of the shaft 34 is threadedly connected to the cap 28 and another end 34b of the shaft 34 is threadedly attached to a hole 24a in the bearing 24. In other embodiments, varying attachment mechanisms may be used. The cap 28 is disposed on the second opposed side 20b of the layer 20. The cap 28 is threadedly connected to the pointer 30. The cap 28 is also connected to the output magnet 26 due to the shaft 34 attaching the cap 28 to the bearing 24 which is attached to the output magnet 26. In such manner, the pointer 30 is connected to the output magnet 26 due to the pointer 30 being connected to the cap 28 which is attached with the shaft 34 to the bearing 24 which is attached to the output magnet 26. As a result, when the output magnet 26 moves the shaft 34, cap 28, and pointer 30 move with the output magnet 26. In other embodiments, varying attachment mechanisms may be used.

When the shaftless stepper motor 16 rotates the shaft 32 thereby rotating the input magnet 22 on the first opposed side 20a of the layer 20, the output magnet 26 disposed on the second opposed side 20b of the layer 20 rotates with the input magnet 22, as a result of magnetism between the input magnet 22 and the output magnet 26, thereby in turn rotating the shaft 34, the cap 28, and the pointer 30 connected to the output magnet 26. Due to the use of the shaftless stepper motor 16, the input magnet 22, and the output magnet 26, precise movement of the pointer 30 is provided without the necessity of cutting any holes in the layer 20 to connect the motor 16 to the pointer 30, and without having to use any members extending over the layer 20 to connect the motor 16 to the pointer 30. Moreover, due to the use of the position of the lighting element 14 within the shaftless portion 16a of the shaftless stepper motor 16, lighting of the pointer 30 is achieved without having to cut any holes in the layer 20, and without having to provide any lighting elements on the second opposed side 20b of the layer 20.

Figure 3:
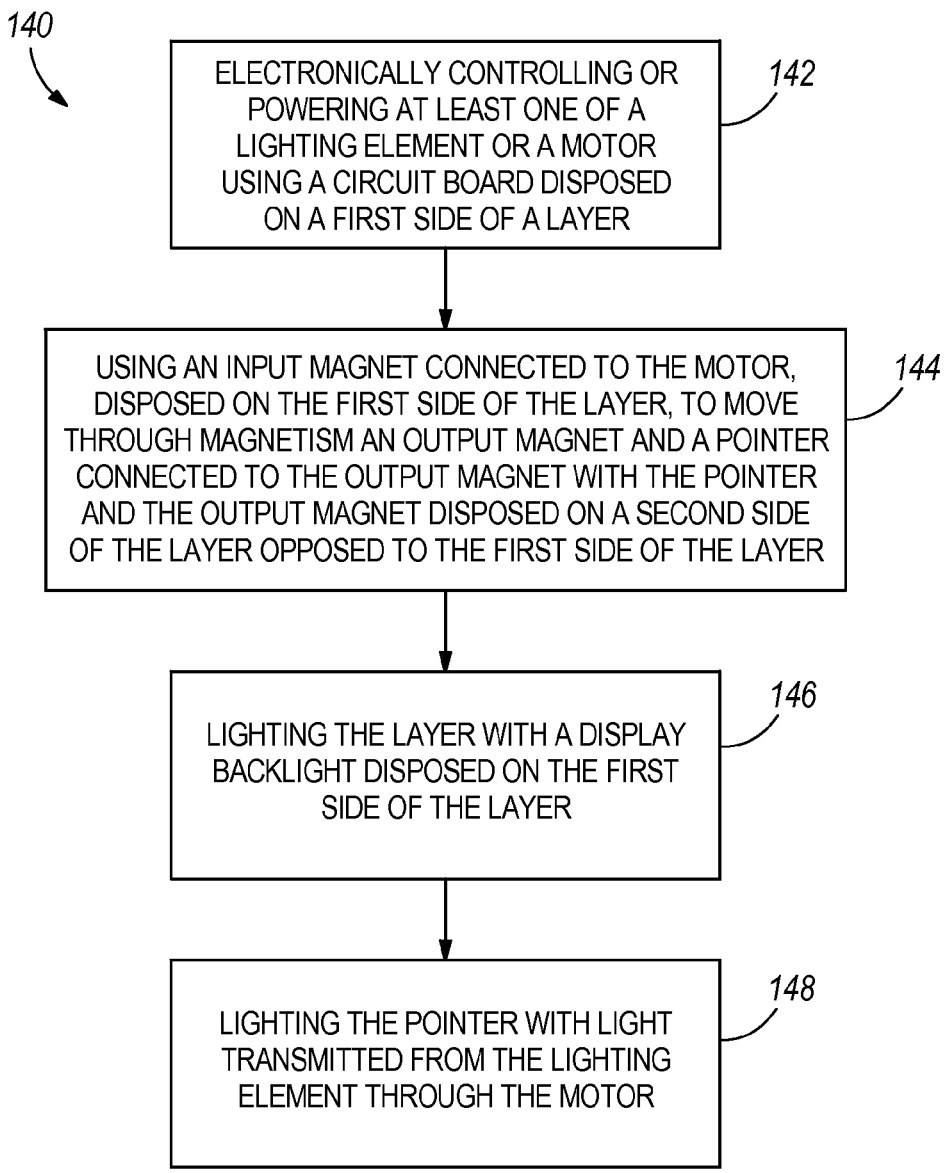
FIG. 3 illustrates a flowchart of one embodiment of a method of operating a pointer.

FIG. 3 illustrates one embodiment of a method 140 of operating a pointer. The method 140 may utilize the system 10 of FIGS. 1 and 2. In other embodiments, the method 140 may utilize varying systems. In step 142, at least one of a lighting element or a motor may be electronically controlled or powered using a circuit board disposed on a first side of a layer. The motor may comprise a shaftless stepper motor. The lighting element may comprise a light-emitting diode or another type of lighting element. In step 144, an input magnet connected to the motor, disposed on the first side of the layer, may move through magnetism an output magnet and a pointer connected to the output magnet with each being disposed on a second side of the layer which is opposed to the first side of the layer. The layer may comprise a display, a liquid crystal display, a thin film transistor liquid crystal display, or another type of layer. The pointer may comprise a portion of a vehicle instrument.

In one embodiment, step 144 may further comprise moving the output magnet, through the magnetism, relative to a bearing to which the output magnet is connected on the second opposed side of the layer. In another embodiment, step 144 may further comprise moving a cap, connected to the output magnet and to the pointer on the second side of the layer, to move the pointer as a result of the magnetism acting on the output magnet. In step 146, the layer may be lit with a display backlight disposed on the first side of the layer. In step 148, the pointer may be lit with light transmitted from the lighting element through the motor. In one embodiment, the lighting element may be aligned with a shaftless portion of the shaftless stepper motor and step 148 may further comprise transmitting light with the lighting element through the shaftless portion of the shaftless stepper motor, through the layer, and to the pointer. In other embodiments, any of the steps of the method 140 may be modified in substance or in order, not followed, or one or more additional steps may be added.

One or more embodiments of the disclosure may reduce one or more issues experienced by one or more current systems or methods by allowing for the precise movement of a pointer without having to cut a hole in a layer, such as a display, to connect the pointer to a motor; without having to extend a member around the layer, such as a display, to connect the pointer to a motor; and without having to provide a lighting element on the same side of the layer, such as a display, as the pointer to light the pointer.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the disclosure is defined by the appended claims. Accordingly, the disclosure is not to be restricted except in light of the appended claims and their equivalents.

The invention claimed is:

1. A system comprising:
 a layer comprising first and second opposed sides;
 a shaftless stepper motor disposed on the first opposed side of the layer;
 a lighting element disposed on the first opposed side of the layer;
 an input magnet disposed on the first opposed side of the layer connected to the shaftless stepper motor;
 an output magnet disposed on the second opposed side of the layer; and
 a pointer connected to the output magnet, wherein the input magnet connected to the shaftless stepper motor moves, through magnetism, the output magnet and the connected pointer, and the lighting element transmits lights to light the pointer.

2. The system of claim 1 wherein the system comprises a vehicle instrument.

3. The system of claim 1 wherein the layer comprises a display.

4. The system of claim 3 wherein the display comprises a liquid crystal display.

5. The system of claim 4 wherein the display comprises a thin film transistor liquid crystal display.

6. The system of claim 3 further comprising a display backlight disposed on the first opposed side of the layer.

7. The system of claim 1 wherein the lighting element comprises a light-emitting diode.

8. The system of claim 1 wherein the lighting element is aligned with a shaftless portion of the shaftless stepper motor and the lighting element transmits light through the shaftless portion of the shaftless stepper motor, through the layer, and to the pointer.

9. The system of claim 1 further comprising a bearing disposed on the second opposed side of the layer, wherein the bearing is connected to the output magnet.

10. The system of claim 1 further comprising a cap disposed on the second opposed side of the layer, wherein the cap is connected to the output magnet and to the pointer.

11. The system of claim 1 further comprising a circuit board, disposed on the first opposed side of the layer, electronically connected to at least one of the lighting element or the shaftless stepper motor.

12. An instrument of a vehicle comprising:
a display comprising first and second opposed sides;
a shaftless stepper motor disposed on the first opposed side of the display;
a lighting element disposed on the first opposed side of the display;
an input magnet disposed on the first opposed side of the display connected to the shaftless stepper motor;
an output magnet disposed on the second opposed side of the display; and
a pointer connected to the output magnet, wherein the input magnet connected to the shaftless stepper motor moves, through magnetism, the output magnet and the connected pointer, and the lighting element transmits light to light the pointer.

13. The instrument of claim 12 wherein the display comprises a liquid crystal display.

14. The instrument of claim 13 wherein the display comprises a thin film transistor liquid crystal display.

15. The instrument of claim 12 further comprising a display backlight disposed on the first opposed side of the display.

16. The instrument of claim 12 wherein the lighting element comprises a light-emitting diode.

17. The instrument of claim 12 wherein the lighting element is aligned with a shaftless portion of the shaftless stepper motor and the lighting element transmits light through the shaftless portion of the shaftless stepper motor, through the display, and to the pointer.

18. The instrument of claim 12 further comprising a bearing disposed on the second opposed side of the display, wherein the bearing is connected to the output magnet.

19. The instrument of claim 12 further comprising a cap disposed on the second opposed side of the layer, wherein the cap is connected to the output magnet and to the pointer.

20. The instrument of claim 12 further comprising a circuit board, disposed on the first opposed side of the display, electronically connected to at least one of the lighting element or the shaftless stepper motor.

21. A method of operating a pointer comprising:
moving an input magnet connected to a shaftless stepper motor, disposed on a first side of a layer, to move through magnetism an output magnet and a pointer connected to the output magnet which are both disposed on a second side of the layer which is opposed to the first side of the layer; and
lighting the pointer light transmitted from a lighting element of the shaftless stepper motor.

22. The method of claim 21 wherein the pointer comprises a portion of a vehicle instrument.

23. The method of claim 21 wherein the layer comprises a display.

24. The method of claim 23 wherein the display comprises a liquid crystal display.

25. The method of claim 24 wherein the display comprises a thin film transistor liquid crystal display.

26. The method of claim 23 further comprising lighting the display with a display backlight disposed on the first side of the layer.

27. The method of claim 21 wherein the lighting element comprises a light-emitting diode.

28. The method of claim 21 wherein the lighting element is aligned with a shaftless portion of the shaftless stepper motor, and further comprising transmitting with the lighting element through the shaftless portion of the shaftless stepper motor, through the layer, and to the pointer.

29. The method of claim 21 further comprising moving the output magnet, through the magnetism, relative to a bearing to which the output magnet is connected on the second side of the layer.

30. The method of claim 21 further comprising moving a cap, connected to the output magnet and to the pointer on the second side of the layer, to move the pointer as a result of the magnetism acting on the output magnet.

31. The method of claim 21 further comprising electronically controlling or powering at least one of the lighting element or the shaftless stepper motor using a circuit board disposed on the first side of the layer.

* * * * *